United States Patent Office 3,002,969
Patented Oct. 3, 1961

3,002,969
3β-HYDROXY-6-METHYL-Δ⁵-STEROIDS AND METHOD OF PREPARATION
Vladimir Petrow and Isobel Ann Stuart-Webb, London, England, assignors to The British Drug Houses Limited, London, England, a British company
No Drawing. Filed Apr. 28, 1958, Ser. No. 731,154
Claims priority, application Great Britain May 3, 1957
11 Claims. (Cl. 260—239.55)

This invention is for improvements in or relating to organic compounds and has particular reference to a method for the preparation of 3β-hydroxy-6-methyl-Δ⁵-steroids (having the general Formula I below).

It is an object of the invention to provide a method for the preparation of 3β-hydroxy-6-methyl-Δ⁵-steroids which compounds are of value as intermediates, for example in the preparation of 6-methylated steroid hormones.

According to the present invention there is provided a method for the preparation of 3β-hydroxy-6-methyl-Δ⁵-steroids having the general formula

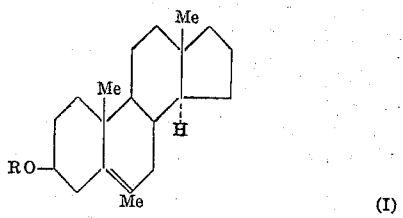

where R=H from 6β-hydroxy- or 6β-acyloxy-3:5-cyclo-steroids having the general formula

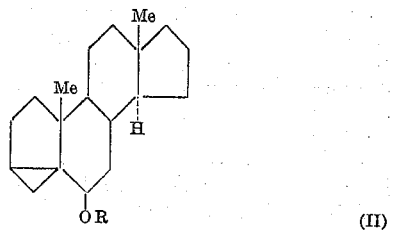

where R=H or acyl which process comprises converting the 6β-hydroxy- or 6β-acyloxy-3:5-cyclo-steroid by oxidation into a 6-oxo-3:5-cyclo-steroid having the general formula

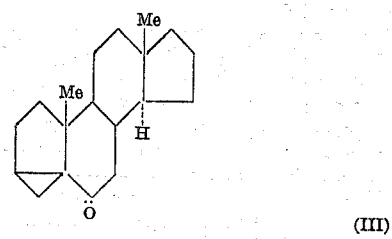

treating the 6-oxo-3:5-cyclo-steroid with a methyl organometallic reagent to give a 6ξ-hydroxy-6ξ-methyl-3:5-cyclo-steroid having the general formula

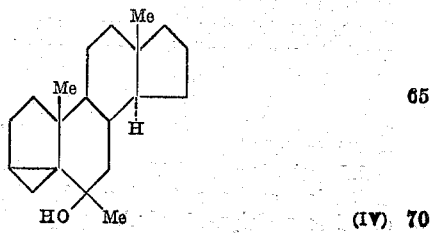

and rearranging the 6ξ-hydroxy-6ξ-methyl-3:5-cyclo-steroid to form the desired 3β-hydroxy-6-methyl-Δ⁵-steroid.

The 6β-hydroxy-3:5-cyclo-steroids (II; R=H) which constitute the starting materials for the invention may be formed from 3β-hydroxy-Δ⁵-steroids by methods well-known to those skilled in the art.

Thus, for example, the 3β-hydroxy-Δ⁵-steroid may be converted into the 3-toluene p-sulphonyloxy or 3-benzene-sulphonyloxy-derivative and then treated with, for example, potassium acetate in aqueous acetone.

Conversion of the 6β-hydroxy-3:5-cyclo-steroid (II; R=H) into the 6-oxo-3:5-cyclo-steroid (III) may conveniently be effected by the use of an oxidising agent such as, for example, chromium trioxide, sodium dichromate, N-bromoacetamide or pyridine/chromic acid. The pyridine/chromic acid complex is the preferred oxidising agent.

Conversion of a 6β-acyloxy-3:5-cyclo-steroid (II; R=acyl) into the 6-oxo-3:5-cyclo-steroid (III) may conveniently be effected by direct oxidation with chromic acid, prior hydrolysis to the 6β-hydroxy-derivative (II; R=H) being unnecessary if this oxidant is employed.

Conversion of the 6-oxo-3:5-cyclo-steroid (III) into the 6ξ-hydroxy-6ξ-methyl-3:5-cyclo-steroid (IV) is preferably effected by the use of a Grignard reagent such as methyl magnesium halide, in an organic solvent such as for example diethyl or dibutyl ether, benzene or tetrahydrofuran.

Rearrangement of the 6ξ-hydroxy-6ξ-methyl-3:5-cyclo-steroid (IV) to give the desired 3β-hydroxy-6-methyl-Δ⁵-structure (I) may be effected in a number of ways as will be apparent to those skilled in the art. In particular, the rearrangement may be effected, for example, by hydrogen ions conveniently provided by sulphuric acid in an aliphatic acid such as glacial acetic acid when the 3β-acetoxy-6-methyl-Δ⁵-steroid (I; R=Ac) is obtained. The last compound may also be obtained by effecting the rearrangement with a Lewis acid such as boron trifluoride in acetic anhydride. The 3β-acyloxy-6-methyl-Δ⁵-steroid (I; R=Acyl) may then be hydrolysed, for example, with aqueous ethanolic alkali, to the 3β-hydroxy-6-methyl-Δ⁵-steroid (I; R=H). The 3β-hydroxy-6-methyl-Δ⁵-steroid (I; R=H) may also be obtained directly from the intermediate (IV) by effecting the rearrangement in an aqueous/organic solvent mixture such as for example aqueous dioxan.

The process of the invention may be applied to a wide variety of 6β-hydroxy-3:5-cyclo-steroids (II) as will be apparent to those skilled in the art. Thus it may be applied to the 6β-hydroxy-3:5-cyclo-steroid structure (V) derived from diosgenin to provide 6-methyl diosgenin (VI), which is of value as it can be degraded to 3β-hy-

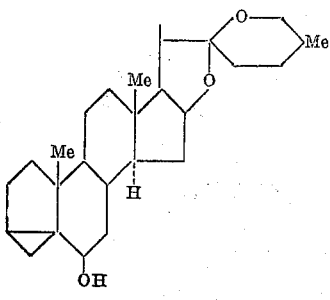

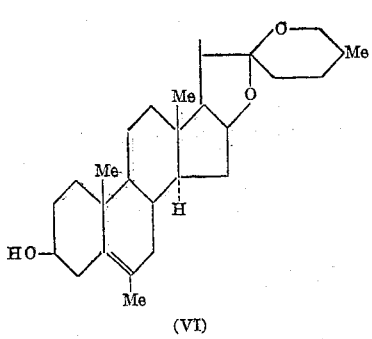

(VI)

droxy-6-methyl-pregna-5:16-dien-20-one, an important intermediate convertible into 6-methyl pregnenolone and into the important 6-methylated steroid hormones. Alternatively 3β-hydroxy-6-methylpregnenolone may be prepared directly from 6β-hydroxy-3:5-cyclopregnan-20-one.

The process of the invention may be applied to the diacyl derivatives of 3:5-cycloandrostane-6β:17β-diol (VII), to provide 6-methylandrost-5-ene-3β:17β-diol (VIII)

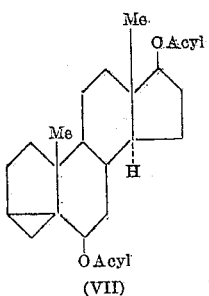

(VII)

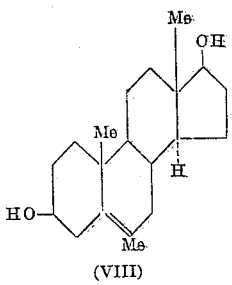

(VIII)

which may be converted into 6-methyltestosterone and thence by hydrogenation into the potent androgenic/anabolic steroid 6-methylandrostanolone.

The process of the invention may also be applied to 17α-ethynyl-17β-hydroxy-3:5-cycloandrostan-6β-ol (IX) to provide 17α-ethynyl-6-methylandrost-5-ene-3β:17β-diol (X).

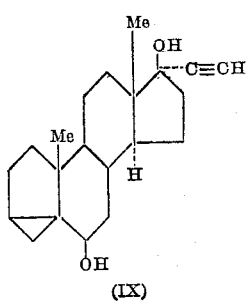

(IX)

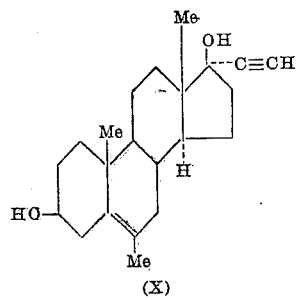

(X)

The product (X) is a valuable intermediate as it yields on oxidation, for example by the Oppenauer method, 6α-methylethisterone which is a potent orally-effective progestational agent.

In applying the process of the invention to 6β-hydroxy- or 6β-acyloxy-3:5-cyclo-steroids containing primary or secondary hydroxy groups (other than at $C_6$), it will usually be necessary to protect such hydroxyl groups, for example by acylation, prior to conversion of such materials into the 6-oxo-3:5-cyclo-steroids by a process of oxidation. Oxo-groups (other than at $C_6$ in structures of type (III)) will, in general, require protection, for example, by ketal formation, in order to avoid their participation in the reaction leading from the intermediate of type (III) to the intermediate of type (IV). Such protected oxo-groups may then be regenerated in a subsequent operation. Alternatively certain oxo groups may be reduced to the corresponding hydroxy groups and subsequently regenerated by oxidation.

Following is a description by way of example of methods of carrying the invention into effect.

EXAMPLE 1

*3β-toluene p-sulphonyloxy-25D-spirost-5-ene.*—3β-hydroxy-25D-spirost-5-ene- (10 g.) in pyridine (100 ml.) was left at room temperature for 40 hours with toluene-p-sulphonic acid (10 g.). Ice-cold water was added, and the precipitated solids collected and dissolved in chloroform. The chloroform solution was washed with water, dried and evaporated under reduced pressure. The residue was crystallised from acetone to give 3β-toluene p-sulphonyloxy-25D-spirost-5-ene, prisms, M.P. 164 to 175° C., $[\alpha]_D^{23}$ —98° (c, 0.415). Optical rotations were measured in chloroform unless otherwise stated.

*3:5-cyclo-25D-spirostan-6β-ol.*—The foregoing compound (25 g.) dissolved in ethyl methyl ketone (1.2 l.) was stirred and heated under reflux for 16 hours with a solution of potassium acetate (32.5 g.) in water (300 ml.). The reaction mixture was poured into water and left overnight, when the product was collected, washed with water and dried. It was then percolated in benzene solution through a short column of alumina. After removal of the benzene, the residue was crystallised from acetone to give 3:5-cyclo-25D-spirostan-6β-ol, plates, M.P. 165 to 166° C., $[\alpha]_D^{23}$ —44° (c, 0.360).

*3:5-cyclo-25D-spirostan-6-one.*—The preceding alcohol (23.3 g.) in dry pyridine (233 ml.) was added to the pyridine/chromic acid complex prepared from chromium trioxide (23.3 g.) and pyridine (233 ml.). The reaction mixture was left overnight at room temperature. Hot benzene was added and the mixture filtered through "hyflo," which was washed repeatedly with hot benzene. The filtrate and washings were combined, washed with dilute hydrochloric acid, dilute sodium hydrogen carbonate solution and water, dried and evaporated. The product was purified by passing it in benzene solution through a short column of alumina. The residue, after evaporation of the benzenee, was crystallised from acetone giving 3:5-cyclo-25D-spirostan-6-one, plates, M.P. 185° C., $[\alpha]_D^{25}$ —48° (c, 0.968).

*3:5-cyclo-6ξ-methyl-25D-spirostan-6ξ-ol.* — 3:5-cyclo-25D-spirostan-6-one (1.84 g.) in ether (184 ml.) was added to a Grignard solution prepared from magnesium (1.1 g.), methyl iodide (3 ml.) and ether (50 ml.). The reaction mixture was heated under reflux for 2 hours, cooled, and decomposed with ammonium chloride solution. The product was isolated with chloroform, and chromatographed in benzene solution on alumina (55 g.). From the benzene:ether (9:1) through to pure ether eluates was obtained 3:5-cyclo-6ξ-methyl-25D-spirostan-6ξ-ol, needles, M.P. 183 to 185° C., $[\alpha]_D^{20}$ —52° (c, 0.339) after crystallisation from acetone.

*3β-acetoxy-6-methyl-25D-spirost-5-ene.* — 3:5-cyclo-6ξ-methyl-25D-spirostan-6ξ-ol (2.7 g.) dissolved in acetic acid (20 ml.) was left overnight at room temperature with acetic acid (20 ml.) containing concentrated sulphuric acid (2 ml.). The mixture was poured into water and the product collected. Crystallisation from chloroform/methanol gave 3β-acetoxy-6-methyl-25D-spirost-5-ene, plates, M.P. 213 to 214° C., $[\alpha]_D^{25}$ —132° (c, 0.283).

*6-methyl-25D-spirost-5-en-3β-ol.*—The foregoing acetate (500 mg.) in methanol (45 ml.) was heated under reflux for 45 minutes with potassium hydroxide (2 g.) in water (5 ml.). The mixture was poured into water and the product isolated with ether. Crystallisation from methanol gave 6-methyl-25D-spirost-5-en-3β-ol, needles, M.P. 181 to 182° C., $[\alpha]_D^{20}$ —126° (c, 0.62).

EXAMPLE 2

*17β - acetoxy-3:5-cycloandrostan-6-one.*—6β,17β-diacetoxy-3:5-cycloandrostane (1 g.) (Wagner et al. J. Org. Chem., 1952, 17, 529) in acetic acid (25 ml.) was left at room temperature for 20 hours with chromium trioxide (300 mg.) in aqueous acetic acid (10 ml. of 90%). Methanol was added and the product isolated with ether. Crystallisation from aqueous methanol or pentane gave 17β-acetoxy-3:5-cycloandrostan-6-one, prisms, M.P. 114 to 116° C.

*17β - acetoxy - 6ξ-methyl-3:5-cycloandrostan-6ξ-ol.*—17β-acetoxy-3:5-cycloandrostan-6-one (3.1 g.) in ether (30 ml.) was added to a Grignard solution prepared from magnesium (2 g.) and methyl iodide (11 ml.) in ether (50 ml.). The reaction mixture was heated under reflux for 1 hour, and then decomposed with ammonium chloride solution. The product was isolated with ether and the crude residue acetylated in the usual way. The resulting compound was purified by trickling through a short column of alumina in benzene: hexane (1:1), when 17β-acetoxy-6ξ-methyl-3:5-cycloandrostan-6ξ-ol was obtained in needles, M.P. 114 to 116° C., $[\alpha]_D^{23}$+25° (c. 0.94).

*3β:17β-diacetoxy-6-methylandrost-5-ene.*—The foregoing product (2.8 g.) in acetic acid (50 ml.) was left at room temperature for 18 hours with sulphuric acid (1 ml.) Water was added and the product was isolated with ether. It was trickled through a short column of alumina in benzene:hexane (1:4), and crystallised from methanol to give 3β:17β-diacetoxy-6-methylandrost-5-ene, leaflets, M.P. 125 to 127° C., $[\alpha]_D^{23}$—82° (c. 1.02).

*6-methylandrost-5-ene-3β:17β-diol.*—The above diacetate (2.8 g.) in methanol (125 ml.) was heated on a steam-bath for 15 minutes with sodium hydroxide (3 g.) in water (125 ml.). The product was isolated with ether/methylene chloride and purified from methanol giving 6-methylandrost-5-ene-3β:17β-diol hemihydrate, needles, M.P. 204 to 206° C., $[\alpha]_D^{27}$—65° (c. 1.03).

EXAMPLE 3

*17α - ethynyl-17β-hydroxy-3:5-cycloandrostan-6-one.*—3:5 - cyclo-17α-ethynyl-androstane-6β:17β-diol (20 g.) (Patel, Petrow and Stuart-Webb, J.C.S., 1957, 665) in pyridine (200 ml.) was added to the pyridine-chromic acid complex prepared previously from chromium trioxide (20 g.) and pyridine (200 ml.). After standing overnight at room temperature, hot benzene was added and the mixture filtered through "hyflo," which was washed repeatedly with hot benzene. The filtrate and washings were combined, washed successively with dilute hydrochloric acid, dilute sodium carbonate solution, and water, dried and evaporated. The residue was trickled through a short column of alumina, and the product crystallised from acetone/hexane to give 17α-ethynyl-17β-hydroxy-3:5-cycloandrostan-6-one, prisms, M.P. 215 to 216° C., $[\alpha]_D^{22}$—12° (c. 0.77). The compound formed an orange 2:4-dinitrophenylhydrazone.

*17α - ethynyl - 6ξ-methyl-3:5-cycloandrostan-6ξ:17β-diol.*—17α - ethynyl - 17β-hydroxy-3:5-cycloandrostan-6-one (7.5 g.) in benzene (250 ml.) was added to a Grignard solution prepared from magnesium (2.3 g.) and methyl iodide (12 ml.) in ether (200 ml.) Part of the ether was distilled off until the temperature of the distillate reached 65° C. and more benzene was added. The mixture was refluxed for 1 hour, cooled and ammonium chloride solution added. The product was isolated with benzene, and a small sample of the resulting oil (1 g.) was chromatographed in benzene solution on to alumina (30 g.). From the ether→ether/acetone eluates was obtained 17α-ethynyl-6ξ-methyl-3:5-cycloandrostan-6ξ:17β-diol, needles, M.P. 85 to 89° C., $[\alpha]_D^{20}$ 0° (c. 0.37).

*3β - acetoxy - 17α-ethynyl-6-methylandrost-5-en-17β-ol.*—The foregoing crude Grignard product (ca. 6.5 g.) in acetic acid (50 ml.) was left at room temperature overnight with concentrated sulphuric acid (2 ml.) in acetic acid (50 ml.). The mixture was poured into water and the product isolated with chloroform. The residue was chromatographed on 130 g. of alumina, in benzene. From the benzene/ether →pure ether eluates was obtained 3β-acetoxy-17α-ethynyl-6-methylandrost-5-en-17β-ol, prisms, M.P. 169 to 170° C., $[\alpha]_D^{22}$—112° (c. 0.67), after crystallisation from acetone/hexane.

*17α - ethynyl-6-methylandrost-5-ene-3β:17β-diol.*—3β-acetoxy-17α-ethynyl - 6 - methylandrost-5-en-17β-ol (2 g.) in methanol (50 ml.) was refluxed for 1 hour with potassium carbonate (1 g.) in water (7 ml.). Water was added and the precipitated solids collected. Crystallisation from aqueous methanol gave needles of 17α-ethynyl-6-methylandrost-5-ene-3β:17β-diol, M.P. 213 to 215° C. $[\alpha]_D^{20}$—116° (c. 0.482).

EXAMPLE 4

*6β:20ξ - diacetoxy - 3:5-cyclopregnane.*—6β-hydroxy-3:5-cyclopregnan-20-one (10 g.) (Patel, Petrow and Stuart-Webb, J.C.S., 1957, 665) in methanol (350 ml.) was treated with sodium borohydride (1.5 g.) and the mixture stood at room temperature for 2½ hours. After addition of a few ml. acetic acid the solution was diluted with water and the oily product isolated with ether. The gum thus obtained was dissolved in pyridine (100 ml.) and acetic anhydride (100 ml.) and stood overnight. The solid obtained after dilution with water was crystallised from methanol to give 6β:20ξ-diacetoxy-3:5-cyclopregnane, plates, M.P. 151 to 153° C., $[\alpha]_D^{20}$+50.7° (c. 0.690).

*20ξ - acetoxy-3:5-cyclopregnan-6-one.*—The foregoing compound (50 g.) in glacial acetic acid (1 l.) was treated at 15° C. with a solution of chromium trioxide (14 g.) in aqueous acetic acid (200 ml. of 90%), and the mixture allowed to stand overnight. Methanol (20 ml.) was then added, the mixture concentrated to ca. 300 ml. in vacuo, and the product isolated by the addition of water and extraction with ether. The neutral fraction, in boiling methanol (300 ml.) was treated with a solution of semicarbazide hydrochloride (15 g.) and anhydrous sodium acetate (15 g.) in aqueous methanol (120 ml. of 50%), the mixture boiled for 10 minutes, cooled, and the crystalline semicarbazone collected, washed and dried. A portion of the semicarbazone (9 g.) in boiling glacial acetic acid (27 ml.) was added to a refluxing solution of anhydrous sodiuf acetate (2.9 g.) in 50% (w./w.) aqueous pyruvic acid (6.3 ml.) and glacial acetic (13.5 ml.). After being refluxed for 10 minutes, water (13.5 ml.) was added and the mixture refluxed for a further 15 minutes, during which time a further 20 ml. of water was added dropwise. The oil thus obtained was isolated with ether. Crystallisation of the gummy product from aqueous methanol gave 20ξ-acetoxy-3:5-cyclopregnan-6-one, flakes, M.P. 131 to 132° C., $[\alpha]_D^{20} + 53.2°$ (c. 0.998).

*6ξ-methyl-3:5-cyclopregnane-6ξ:20ξ-diol.*—The foregoing compound (5.5 g.) in dry ether (100 ml.) was added to a solution of methylmagnesium iodide prepared from magnesium (5.5 g.) and methyl iodide (30 ml.) in ether (100 ml.). After refluxing for 4½ hours, the mixture was cooled in ice and the complex decomposed by addition of ammonium chloride (27.5 g.) in water. The crystalline product obtained by isolation with ether was crystallised from methanol containing a trace of pyridine. 6ξ-methyl-3:5-cyclopregnane-6ξ:20ξ-diol was obtained as needles, M.P. 231 to 232° C., $[\alpha]_D^{23} + 18.8°$ (c. 0.426).

*6ξ-hydroxy-6ξ-methyl-3:5-cyclopregnan-20 - one.*—The foregoing diol (4.0 g.) in dry pyridine (55 ml.) and benzene (10 ml.) was added to the chromium trioxide/pyridine complex prepared from chromium trioxide (4.0 g.) in pyridine (40 ml.) and the mixture stirred for 3 hours. After standing overnight, the mixture was diluted with benzene (50 ml.), filtered and the precipitate washed thrice with benzene (10 ml.). The filtrate and washings were combined and washed with dilute hydrochloric acid, water, dilute sodium hydrogen carbonate solution, water to neutrality, dried and evaporated. Crystallisation from hexane gave 6ξ-methyl - 3:5 - cyclopregnan - 6ξ-ol-20-one, prisms, M.P. 105 to 106° C., $[\alpha]_D^{19} + 111.1°$ (c. 0.936).

*3β-acetoxy-6-methylpregn-5-en-20-one.*—The foregoing compound (500 mg.) was dissolved in a mixture of concentrated sulphuric acid (0.1 ml.) in glacial acetic acid (6 ml.). After standing overnight the mixture was poured into water and the product isolated with ether. The solid thus obtained was crystallised from methanol to give 3β-acetoxy-6-methylpregn-5-en-20-one, needles, M.P. 151 to 152° C., not depressed in admixture with an authentic specimen.

We claim:

1. A method for the preparation of a 3β-hydroxy-6-methyl-Δ⁵-steroid selected from the group consisting of the spirostane, androstane and pregnane series from a corresponding 6β-hydroxy-5:5-cyclo-steroid which process comprises oxidizing said 6β-hydroxy-3:5-cyclo-steroid with chromium trioxide to form a 6-oxo-3:5-cyclo-steroid, treating said 6-oxo-3:5-cyclo-steroid with a methyl magnesium halide to give a 6ξ-hydroxy-6ξ-methyl-3:5-cyclo-steroid and rearranging said 6ξ-hydroxy-6ξ-methyl-3:5-cyclo-steroid with a source of hydrogen ions to form said 3β-hydroxy-6-methyl-Δ⁵-steroid.

2. A method as claimed in claim 1 wherein said oxidation is effected by the use of chromium trioxide in aqueous acetic acid.

3. A method as claimed in claim 1 wherein said oxidation is effected by the use of pyridine/chromium trioxide.

4. A method as claimed in claim 1 wherein conversion of said 6-oxo-3:5-cyclo-steroid into said 6ξ-hydroxy-6ξ-methyl-3:5-cyclo-steroid is effected by the use of a methyl magnesium iodide.

5. A method as claimed in claim 1 wherein rearrangement of said 6ξ-hydroxy-6ξ-methyl-3:5-cyclo- steroid to give said 3β-hydroxy-6-methyl-Δ⁵-steroid is effected by treatment with sulfuric acid in glacial acetic acid to give the 3β-acetoxy-6-methyl-Δ⁵-steroid followed by hydrolysis with aqueous ethanolic alkali.

6. A method as claimed in claim 1 wherein rearrangement of said 6ξ-hydroxy-6ξ-methyl-3:5-cyclo-steroid to give said 3β-hydroxy-6-methyl-Δ⁵-steroid is effected directly by the use of sulfuric acid in aqueous dioxan.

7. 6-methyl-25D-spirost-5-en-3β-ol.

8. A method for the preparation of a 3β-hydroxy-6-methyl-Δ⁵-steroid from a corresponding 6β-acyloxy-3:5-cyclo-steroid selected from the group consisting of the spirostane, androstane and pregnane series which process comprises oxidizing said 6β-acyloxy-3:5-cyclo-steroid with chromium trioxide to form a 6-oxo-3:5-cyclo-steroid, treating said 6-oxo-3:5-cyclo-steroid with a methyl magnesium halide to give a 6ξhyroxy-6ξmethyl-3:5-cyclo-steroid and rearranging said 6ξ-hydroxy-6ξ-methyl-3:5-cyclo-steroid with a source of hydrogen ions to form said 3β-hydroxy-6-methyl-Δ⁵-steroid.

9. 3β-acetoxy-6-methyl-25D-spirost-5-ene.

10. 3β - acetoxy - 17α - ethynyl-6-methylandrost-5-ene-17β-ol.

11. A compound selected from the group consisting of 3β-hydroxy-6-methyl-spirost-5-ene and the 3β-lower alkanoyloxy derivatives thereof.

References Cited in the file of this patent
UNITED STATES PATENTS

| | | |
|---|---|---|
| 2,565,670 | Wechsler et al. | Aug. 28, 1951 |
| 2,830,063 | Clinton et al. | Apr. 8, 1958 |
| 2,871,246 | Loken | Jan. 27, 1959 |
| 2,878,246 | Miramontes et al. | Mar. 17, 1959 |
| 2,878,247 | Miramontes et al. | Mar. 17, 1959 |

OTHER REFERENCES

Patel et al.: J. C. S., 1957, page 665.